United States Patent Office 2,904,470
Patented Sept. 15, 1959

2,904,470

DIATOMIC IODINE-HYPOIODOUS ACID GENERATING COMPOSITIONS

Abraham Berliner and Benjamin Carroll, New York, N.Y.

No Drawing. Application December 1, 1955
Serial No. 550,463

7 Claims. (Cl. 167—70)

This invention relates to germicides and more particularly to a novel iodine containing composition that is adapted to be dissolved in water to produce an aqueous solution of diatomic iodine and hypoiodous acid, which solution is also new and possesses improved germicidal properties. Germicidal iodine-containing solutions made according to the present invention may be used for either therapeutic purposes or as sterilizing agents for a variety of non-therapeutic applications. The present application is a continuation-in-part of our pending applications Serial No. 432,328, filed May 25, 1954, and Serial No. 458,987, filed September 28, 1954, both of which are now abandoned.

It has of course been known for many years that iodine and certain of its compounds possess useful germicidal properties. Numerous iodine-containing compositions have been previously proposed including aqueous and alcoholic solutions of elemental iodine and solutions of elemental iodine in aqueous metal iodides, but all of these prior compositions have been subject to certain defects. Thus iodine in aqueous solution has not been extensively used because it is difficult to dissolve, has only a limited solubility in water, and yields solutions which are not sufficiently stable to be stored over extended periods of time. In general, such solutions are effective only when they are used shortly after they are prepared. To overcome these defects, solutions of iodine in aqueous metal iodides have been used. While the quantity of iodine in solution can be greatly increased in this way, the iodine in such solutions is in the form of tri-iodides which are not only substantially inferior to elemental iodine in their germicidal properties but also are to some extent toxic toward animal tissue.

It is accordingly an object of the present invention to provide a novel aqueous iodine-containing solution which for a given iodine concentration possesses improved e.g. fast-acting, germicidal properties. It is another object of the invention to provide an aqueous solution containing elemental iodine and an agent capable of re-oxidizing to elemental form iodine that has been converted to iodine compounds by reaction with organic matter and bacteria. It is still another object of the invention to provide a solid composition which dissolves readily in water to form such an aqueous solution and which can, if desired, be formulated as a tablet. Other objects of the invention will be in part obvious and in part pointed out hereafter.

The present invention is based on our discovery that aqueous solutions containing elemental iodine and hypoiodous acid prepared as described herein have improved germicidal activity. We have found that diatomic iodine and hypoiodous acid in such solutions exhibit a synergistic effect, that is, the germicidal effectiveness of the solutions is greater than would be expected from a mere mixture of these two substances. Moreover, the hypoiodous acid acts to re-oxidize and thereby re-generate that portion of the elemental iodine which is reduced by reaction with bacteria or other organic matter, thus prolonging the activity of the solution.

It is known that when elemental iodine is dissolved in water a minute quantity of hypoiodous acid is formed. However, this quantity of hypoiodous acid is too small to provide any useful therapeutic effect. It should be noted that the solutions of the present invention contain hypoiodous acid at a concentration greater than that produced when iodine is dissolved in water. Also the solutions are preferably essentially free from iodide and tri-iodide ions.

We have further found that aqueous solutions of diatomic iodine and hypoiodous acid are relatively unstable and that if effective germicidal action is to be achieved the solutions must be prepared under carefully controlled conditions as described herein. Because of the comparative instability of the solutions, it is desirable that they be prepared shortly before they are used and accordingly the present invention contemplates the use of a solid composition which is readily soluble in water and contains all the ingredients necessary to produce the desired germicidal solution. One type of solid composition that has been found useful in preparing the present solutions comprises a water soluble metal iodide and a chlorine-bearing organic compound which when dissolved in water yields hypochlorous acid. The reaction of hypochlorous acid and metal iodide to form diatomic iodine and hypoiodous acid may be represented by the following equations:

$$HClO + 2I^- = I_2 + Cl^- + OH^-$$

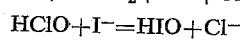

$$HClO + I^- = HIO + Cl^-$$

We have further found that even if the solution is freshly prepared from a solid composition as indicated above, it may still be too unstable to be practical unless certain other factors are also controlled. For example, it has been found important to maintain the ratio of chlorine-bearing compound to metal iodide within particular limits if a reasonably stable solution is to be achieved, and it has also been found that pH has an important bearing on the stability of the solution. The chlorine-bearing compound and metal iodide are desirably used in such proportions that the molar ratio of active chlorine in the chlorine-bearing compound to the metal iodide is from 0.51 to 0.75. The pH of the solution should be maintained between 3 and 8, the optimum pH for most solutions being about 6. The desired control of pH can be conveniently obtained by incorporating in the solid composition a buffer which when dissolved in water maintains the pH within the desired range.

To produce the desired germicidal solution the solid composition is dissolved in a sufficient quantity of water to give a solution containing from 5 to 600 parts per million of diatomic iodine and from 3 to 100 parts per million of HIO in excess of that normally present when diatomic iodine hydrolyzes in water. When the proper proportions of chlorine-bearing compound and metal iodide are used and the pH is maintained within the proper range, a solution essentially free from iodide and tri-iodide ions is obtained. Such solutions retain a high degree of germicidal activity, i.e. a degree of activity significantly greater than that given by elemental iodine alone, for a period of 5 minutes to an hour. The ratio of diatomic iodine to hypoiodous acid can be varied by varying the ratio of chlorine-bearing compound to metal iodide in the solid composition, the higher ratios producing higher HIO concentrations. The optimum ratio of $I_2$ to HIO appears to be in the neighborhood of 5:1.

Another factor that affects the stability of the solutions is the total concentration of germicidal ingredients. In general dilute solutions are more stable than concentrated solutions, and their germicidal activity decreases more slowly. On the other hand the initial germicidal activity of dilute solutions is less than that of concentrated solutions. Thus for therapeutic applications it is usually preferable to employ moderately concentrated solutions having a high-activity period of say 5 to 20 minutes, whereas for sanitizing or general sterilizing purposes it is ordinarily preferable to use a more dilute solution which retains its activity for 30 to 60 minutes.

Solutions prepared in the manner indicated may be used for various therapeutic applications for which iodine solutions have previously been used such as, for example, general topical applications in cases of infection and for the prevention of infection. Also the solutions may be used with advantage for non-therapeutic applications such as for general sanitizing purposes.

Usually all iodine solutions, even those supposedly containing purely elemental iodine, have small quantities of tri-iodide and hypoiodous acid. This is due to some extent to the hydrolysis of $I_2$ in water according to equations:

$$I_2 + H_2O = I^- + H^+ + HIO$$
$$I_2 + I^- = I_3^-$$

The amount of tri-iodide resulting from the reaction indicated by the above equations is negligible compared to the tri-iodide caused by the oxidation of slight quantities of organic matter usually found in water and in receptacles for iodine solutions. We have found that for a freshly prepared iodine solution the presence of a small quantity of hypoiodous acid above that normally present in solutions of diatomic iodine will instantly free the iodine solution of the poorly germicidal tri-iodide species. We found no other oxidant which is more satisfactory than hypoiodous acid in rapidly and effectively suppressing the presence of tri-iodide ions in iodine solutions over a time interval of several minutes. Similarly the hypoiodous acid oxidizes any iodide ions that may be formed according to the following equation:

$$HIO + I^- = I_2 + OH^-$$

Thus the initial intense germicidal properties of the elemental iodine are sustained for a longer period of time in the presence of hypoiodous acid.

Although hypoiodous acid is relatively unstable, it is a remarkably effective germicide for short periods immediately after its formation, and the length of the effective period may be prolonged by avoiding the use of very high concentrations, i.e. concentrations much above a hundred p.p.m. We have found the toxicity of hypoiodous acid to animal tissue to be relatively small and since it is very soluble in water it may be added to saturated solutions of elemental iodine to enhance greatly the germicidal effectiveness of the solution without appreciably increasing the toxicity of the solution toward animal tissue. When the pH of the solution is maintained within the range indicated above and the other conditions are maintained as outlined the decomposition of hypoiodous acid, even in the presence of elemental iodine, is accompanied by formation of diatomic iodine. Thus aqueous iodine solutions containing hypoiodous acid will generate diatomic iodine for several minutes after formation of the solution.

As indicated above, the solutions of the present invention can conveniently be made from solid compositions comprising a chlorine-bearing compound and a metal iodide, the chlorine-bearing compound being one which when dissolved in water produces hypochlorous acid. Typical examples of such compounds are chloramine-T (sodium N-chloro toluenesulfonamide), chloramine-B (sodium N-chloro benzene sulfonamide), and N-chloro-succinimide. The chlorine-bearing compound used should be sufficiently water-soluble to yield at least about 10 p.p.m. of available chlorine in solution. The water-soluble metal iodides may be an alkali metal iodide such as sodium or potassium iodide. Among the buffers that may be used are citric acid, various phosphates, potassium biphthalate and more generally any known buffer which will maintain the pH of the solution between 3 and 8 and will not interfere with the desired reaction between the principal ingredients.

In addition to the chlorine-bearing compound, buffer and metal iodide, the present solid composition, particularly if it is to be pressed into tablet form, may contain various other ingredients. For example, in order to assist the tablet in dissolving in water it is frequently desirable to have the tablet effervesce, and to achieve such effervescence a quantity of sodium bicarbonate or other suitable carbonate may be incorporated in the composition. In cases where the solution formed from the tablet is to be used as an oral lavage it may be desirable to include a sweetener in the tablet. This sweetener should be selected with some care to avoid incorporating an organic compound that is readily oxidized by the iodine or hypoiodous acid. We have found that sucrose or fructose are suitable for this purpose. The composition may also include binders and inert fillers well known in the tablet-making art, provided that such components are non-reactive or substantially non-reactive with the principle ingredients of the composition.

In order to point out more fully the nature of the present invention, the following specific examples are given of solid compositions capable of being dissolved in water to produce the solutions of the present invention.

*Example 1*

Chloramine-T (sodium N-chlor-p-toluene sulfonamide) was dried to contain less than 2% water of hydration and then mixed with potassium iodide, citris acid, sodium bicarbonate and non-reactive fillers in the proportions given below and pressed to form a tablet. The ingredients other than chloramine-T were used in the anhydrous state with the surface moisture removed.

| | Mgs. |
|---|---|
| Chloroamine-T | 26.5 |
| Potassium iodide | 32.7 |
| Citric acid | 170.50 |
| Sodium bicarbonate | 250.93 |
| Non-reactive fillers | 167.13 |

The molar ratio of active chlorine to metal iodide in the above mixture is 0.57.

The composition as thus prepared was dissolved in 4 oz. of water and gave a solution having a pH of 5.5. The solution contained 20.8 milligrams of diatomic iodine and approximately 4.2 mgs. of iodine as HIO. At the end of 5 minutes the amount of HIO, by virtue of its partial decomposition, decreased to approximately 2.7 mgs. and elemental iodine content rose to 21.8 mgs.

*Example 2*

Chloramine-T was dried at 85° C. for 5 hours in vacuo so that only about 1% water of hydration remained. Quantities of potassium iodide, potassium dihydrogen phosphate and disodium hydrogen phosphate were dried at 130° C. for 30 minutes. These materials were then mixed in a dry atmosphere in the following proportion:

| Ingredient: | Parts by weight |
|---|---|
| Chloramine-T | 10 |
| Potassium iodide | 13.1 |
| $KH_2PO_4$ | 51.9 |
| $Na_2HPO_4$ | 25.0 |

This mixture had a molar ratio of active chlorine to metal iodide of 0.53.

The solid composition was dissolved in water to produce a 0.2% by weight solution which solution had a pH of 6.0. At the end of one minute this solution had diatomic iodine and hypoiodous acid concentrations of 185 p.p.m. and 12 p.p.m. respectively. At the end of 6 minutes the diatomic iodine concentration had increased to 191 p.p.m. and the HIO concentration had decreased to 5 p.p.m.

Example 3

Chloramine-B ($C_6H_5SO_2NClNa$) was dried at 90° C. for about 2 hours, during which period it lost about 12.4% of its weight as $H_2O$. Analysis of the dry material showed that it had an active chlorine content of 16.4%.

Potassium iodide and sodium dihydrogen phosphate were dried at 100° for thirty minutes and mixed with the dried chloramine-B in the following proportions to produce a mixture having a molar ratio of active chlorine to KI of about 0.75.

| Ingredient: | Parts by weight |
|---|---|
| Chloramine-B | 20.7 |
| Potassium iodide | 24.0 |
| Sodium dihydrogen phosphate | 55.3 |

When 0.164 gm. of this powder was dissolved in 100 gms. of water at 32° C., a solution of pH 6.5 was obtained. At the end of one minute this solution contained 258 p.p.m. of $I_2$ and 30 p.p.m. of iodine as HIO. At the end of 20 minutes the $I_2$ content had increased to 275 p.p.m. and the iodine as HIO had dropped to 5 p.p.m.

It is of course to be understood that the foregoing examples are illustrative only and that numerous changes can be made in the ingredients, proportions and conditions described without departing from the spirit of the invention as defined in the appended claims.

We claim:

1. A solid composition adapted to be dissolved in water to form a stable germicidal solution of diatomic iodine and hypoiodous acid, said composition comprising an organic chlorine-bearing compound reactive with water to form hypo-chlorous acid, a water soluble metal iodide and a buffer which in an aqueous solution maintains a solution pH of 3 to 8, the molar ratio of active chlorine in said chlorine-bearing compound to metal iodide in said composition being between 0.51 and 0.75.

2. A composition according to claim 1 and wherein said chlorine-bearing compound is sodium N-chloro-p-toluene sulfonamide.

3. A composition according to claim 1 and wherein said chlorine-bearing compound is sodium N-chloro benzene sulfonamide.

4. A composition according to claim 1 and wherein said chlorine-bearing compound is N-chlorosuccinimide.

5. A tablet comprising an organic chlorine-bearing compound reactive with water to form hypochlorous acid, an alkali metal iodide, an acidic buffer, a non-reactive filler and an inorganic carbonate reactive with said buffer in the presence of water to cause said tablet to effervesce, said buffer and carbonate being reactive in aqueous solution to maintain a solution pH of 3 to 8 and the molar ratio of said chlorine-bearing compound to said metal iodide being between 0.51 and 0.75.

6. A tablet according to claim 5 and wherein the chlorine-bearing compound is chloramine T and the metal iodide is potassium iodide.

7. A tablet adapted to be dissolved in water to form a germicial solution of diatomic iodine and hypoiodous acid, said tablet comprising chloramine T, potassium iodide, citric acid, sodium bicarbonate and a non-reactive filler, the molar ratio of chloramine T to potassium iodide in said tablet being between 0.51 and 0.75, said citric acid and sodium bicarbonate being reactive in aqueous solution to maintain a solution pH of 3 to 8.

References Cited in the file of this patent

UNITED STATES PATENTS

| 1,429,276 | Davis | Sept. 19, 1922 |
| 1,867,222 | Karns | July 12, 1932 |
| 1,925,135 | Chandler | Sept. 5, 1933 |
| 2,250,504 | Salerni | July 29, 1941 |
| 2,380,970 | Kitter | Aug. 7, 1945 |
| 2,517,651 | Frost | Aug. 8, 1950 |
| 2,817,621 | Marks et al. | Dec. 24, 1957 |

OTHER REFERENCES

Allawala: Jour. Am. Pharm. Asso., Sci. Ed., vol. XLII, No. 7, pp. 397–401.